US011316682B2

(12) United States Patent
Liu et al.

(10) Patent No.: US 11,316,682 B2
(45) Date of Patent: Apr. 26, 2022

(54) METHOD FOR IMPLEMENTATION OF POST-QUANTUM KEY EXCHANGE PROTOCOL AND APPLICATION THEREOF

(71) Applicant: HUAZHONG UNIVERSITY OF SCIENCE AND TECHNOLOGY, Wuhan (CN)

(72) Inventors: Dongsheng Liu, Wuhan (CN); Xingjie Liu, Wuhan (CN); Cong Zhang, Wuhan (CN); Zilong Liu, Wuhan (CN); Ang Hu, Wuhan (CN); Wending Zhao, Wuhan (CN); Zirui Jin, Wuhan (CN); Jiahao Lu, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 28 days.

(21) Appl. No.: 16/905,897

(22) Filed: Jun. 18, 2020

(65) Prior Publication Data

US 2021/0218563 A1 Jul. 15, 2021

(51) Int. Cl.
*H04L 9/08* (2006.01)
*H04L 9/06* (2006.01)

(52) U.S. Cl.
CPC .......... *H04L 9/0869* (2013.01); *H04L 9/0643* (2013.01); *H04L 9/0819* (2013.01); *H04L 9/0894* (2013.01)

(58) Field of Classification Search
CPC ... H04L 9/0869; H04L 9/0643; H04L 9/0819; H04L 9/0894
(Continued)

(56) References Cited

U.S. PATENT DOCUMENTS 10,630,478 B1 4/2020 Yavuz
2019/0319804 A1 10/2019 Mathew et al.
(Continued)

FOREIGN PATENT DOCUMENTS

CN 108111301 A 6/2018

OTHER PUBLICATIONS

Oder T., Güneysu T. (2019) "Implementing the NewHope-Simple Key Exchange on Low-Cost FPGAs." In: Lange T., Dunkelman O. (eds) Progress in Cryptology—LATINCRYPT 2017. LATINCRYPT 2017. Lecture Notes in Computer Science, vol. 11368. Springer, Cham. https://doi.org/10.1007/978-3-030-25283-0_7 (Year: 2019).*
(Continued)

*Primary Examiner* — Kambiz Zand
*Assistant Examiner* — Phuc Pham
(74) *Attorney, Agent, or Firm* — True Shepherd LLC; Andrew C. Cheng

(57) ABSTRACT

The disclosure proposes a novel method for generating public polynomials. The method simplifies key exchange processes, reduces the time required for key exchange and reduces the bandwidth required for data transmission from a server to a client. Secondly, the method keeps the calculation processes at both sides synchronized through a novel data exchange solution, particularly through handshaking signals, to ensure that the server and the client are always in the same key exchange process. In addition, the method further reduces a transmission bandwidth by sending information of the client twice. A state synchronization mechanism of the client and the server is proposed in the disclosure to ensure that Trivium modules at both sides are in the same state at the beginning of each key exchange, thereby avoiding reinitializing the modules and improving the operation efficiency of the whole system.

10 Claims, 3 Drawing Sheets

100 a client generates the public polynomial $\hat{a}_1$ based on the Trivium module therein and generates the polynomial $\hat{p}$ based on the polynomial $\hat{a}_1$, then sends a data request signal to a server to receive the polynomial $\hat{b}$, and receives a data request signal sent by the server to send the polynomial $\hat{p}$, wherein the public polynomial $\hat{a}_2$ for calculating the polynomial $\hat{b}$ is generated by the server with adoption of a random number sequence generated by a Trivium module in the server — 110 the client generates the key $\mu$ and the polynomial $\bar{c}$ based on the Trivium module therein, and sends the polynomial $\bar{c}$ to the server based on another received data request signal sent by the server, so that the server generates the key $\mu$ based on the polynomial $\bar{c}$ and adjusts a state of the Trivium module in the server to be synchronized with a current state of the Trivium module in the client — 120

(58) Field of Classification Search
USPC .......................................................... 713/171
See application file for complete search history.

(56) References Cited

U.S. PATENT DOCUMENTS

2019/0386825 A1  12/2019  Bhattacharya et al.
2020/0010660 A1   1/2020  Higashikawa et al.

OTHER PUBLICATIONS

Yufei Xing, Shuguo Li, "An Efficient Implementation of the NewHope Key Exchange on FPGAs", IEEE Transactions on Circuits and Systems—I:Regular Papers,vol. 67, No. 3, Dec. 9, 2019 (Dec. 9, 2019), (Year: 2019).*

* cited by examiner

100 a client generates the public polynomial $\hat{a}_1$ based on the Trivium module therein and generates the polynomial $\hat{\mu}$ based on the polynomial $\hat{a}_1$, then sends a data request signal to a server to receive the polynomial $\hat{b}$, and receives a data request signal sent by the server to send the polynomial $\hat{\mu}$, wherein the public polynomial $\hat{a}_2$ for calculating the polynomial $\hat{b}$ is generated by the server with adoption of a random number sequence generated by a Trivium module in the server — 110 the client generates the key $\mu$ and the polynomial $\bar{c}$ based on the Trivium module therein, and sends the polynomial $\bar{c}$ to the server based on another received data request signal sent by the server, so that the server generates the key $\mu$ based on the polynomial $\bar{c}$ and adjusts a state of the Trivium module in the server to be synchronized with a current state of the Trivium module in the client — 120

FIG. 1

METHOD FOR IMPLEMENTATION OF POST-QUANTUM KEY EXCHANGE PROTOCOL AND APPLICATION THEREOF

CROSS-REFERENCE TO RELATED APPLICATIONS

This application is claims priority to Chinese Patent Application No. 202010031242.2 with a filing date of Jan. 13, 2020. The content of the aforementioned application, including any intervening amendments thereto, is incorporated herein by reference.

TECHNICAL FIELD

The disclosure belongs to the field of implementation of information security algorithms, and more particularly relates to a method for implementation of a post-quantum key exchange protocol and application thereof.

BACKGROUND OF THE PRESENT INVENTION

With the advent of quantum computers, traditional encryption algorithms and key exchange solutions based on large integer factorization and discrete logarithms are no longer secure and reliable. Key exchange technology based on lattice theory is a potential solution for information security problems in the post-quantum era. "NewHope" is a key exchange protocol based on ring learning with error (Ring-LWE). On Jan. 30, 2019, the National Institute of Standards and Technology (NIST) in U.S.A announced that the NewHope was one of candidate algorithms for the second-round selection of public key encryption and key exchange algorithms in the post-quantum encryption project, and was expected to become the standard for the key exchange solutions in the post-quantum era.

NewHope-Simple, as an improved version proposed by the author of NewHope, can reduce the complexity of the protocol by slightly increasing the size of exchanged message without changing the protocol security level and is more conducive to hardware implementation.

However, the existing hardware implementation solution for NewHope-Simple has problems of low computation speed, high resource overhead and high transmission bandwidth requirement. In the existing technical solution, the server uses a 256 bit seed to generate a public polynomial $\hat{a}$. The seed is sent to the client together with a polynomial $\hat{b}$; and the client obtains the same $\hat{a}$ using the seed. In the solution, the client must wait for the data from the server to arrive before generating the public polynomial $\hat{a}$, so that the flow of the existing technical solution is slow and inefficient. Secondly, registers are used for storing polynomial coefficients in the existing technical solution, which requires more register resources and is not conducive to the control of data streams. In addition, the client sends polynomials $\hat{u}$ and $\bar{c}$ to the server at the same step, so that the system has high requirements for bandwidth relatively; and the server cannot calculate a polynomial m until the data arrive, thereby affecting the speed of key exchange. In order to enable the NewHope key exchange protocol to be put into use in daily applications, designing a hardware implementation solution featured with high speed, high efficiency, less resource occupation and low transmission bandwidth limitation is worthy of intensive study.

SUMMARY OF PRESENT INVENTION

The disclosure provides a method for implementation of a post-quantum key exchange protocol and application thereof, for solving a technical problem of slow exchange because the exchange process is a single thread during implementation of the existing post-quantum key exchange protocol.

The technical solution adopted by the disclosure for solving the technical problems is as follows: the method for implementation of the post-quantum key exchange protocol comprises:

Step 1, a client generates a public polynomial $\hat{a}_1$ based on a Trivium module therein and generates a polynomial $\hat{u}$ based on the polynomial $\hat{a}_1$, then the client sends a data request signal to receive a polynomial $\hat{b}$ from a server; after completing the transfer, the client receives a data request signal from the server and hence sends a polynomial $\hat{u}$ to the server, wherein a public polynomial $\hat{a}_2$ for calculating the polynomial $\hat{b}$ is generated by the server with adoption of a random number sequence generated by a Trivium module in the server, and $\hat{a}_1 = \hat{a}_2$;

Step 2, the client generates a key $\mu$ and a polynomial $\bar{c}$ based on the Trivium module therein, and sends the polynomial $\bar{c}$ to the server based on another received data request signal sent by the server, so that the server generates the key $\mu$ based on the polynomial $\bar{c}$ and adjusts the state of the Trivium module in the server to be synchronized with a current state of the Trivium module in the client.

The disclosure can also be improved as follows based on the aforementioned technical solution.

Further, the step of generating the polynomial $\hat{u}$ based on the polynomial $\hat{a}_1$ comprises:

the client adopting the random number sequence generated by the Trivium module in the client to generate polynomials s' and e' respectively, and calculating number-theoretic transformation polynomials of the polynomials s' and e' respectively, and calculating a sum of the number-theoretic transformation polynomial of the polynomial e' and a product of the number-theoretic transformation polynomial of the polynomial s' and the public polynomial $\hat{a}_1$ to obtain the polynomial $\hat{u}$, wherein the Trivium module in the client generates a 64 bit random number in one cycle.

Further, the step that the client generates the key $\mu$ and the polynomial $\bar{c}$ based on the Trivium module therein comprises:

the client synchronously calculating the key $\mu$ and a polynomial e" based on the random number sequence generated by the Trivium module therein, calculating a product of the number-theoretic transformation polynomial of the polynomial s' and the polynomial $\hat{b}$, and performing inverse number-theoretic transformation to the product, wherein the key $\mu$ is obtained in a manner that the client performs first secure hash algorithm 3 (SHA3) on the random number sequence generated by the Trivium module therein to obtain v' and performs second SHA3 on v';

the client encoding the v' to obtain a polynomial k; and calculating a sum of the polynomial e", the polynomial k and a result of the inverse the number-theoretic transformation to obtain a polynomial c, and compressing the polynomial c to obtain the polynomial $\bar{c}$.

Further, all the polynomials are stored in memories, and the polynomials obtained at the same step are stored in different memories respectively.

The disclosure also provides a client, comprising a processor for implementation of the post-quantum key exchange protocol according to the method for implementation of the post-quantum key exchange protocol described above.

The disclosure further provides a method for implementation of a post-quantum key exchange protocol, comprising:

Step 1, a server generates a public polynomial $\hat{a}_2$ based on a Trivium module therein and generates a polynomial $\hat{b}$ based on the polynomial $\hat{a}_2$, then receives a data request signal to send the polynomial $\hat{b}$ to a client, and sends a data request signal to the client to receive a polynomial $\hat{u}$, wherein the polynomial $\hat{a}_1$ for calculating the polynomial $\hat{u}$ is generated by the client with adoption of a random number sequence generated by the Trivium module in the client, and $\hat{a}_1 = \hat{a}_2$;

Step 2, the server generates a polynomial m based on the polynomial $\hat{u}$, sends another data request signal to the client to receive a polynomial $\bar{c}$ corresponding to a key μ sent by the client, and generates the key μ based on the polynomial m and the polynomial $\bar{c}$; and Step 3, the server controls the Trivium module therein to continue working for a period of lime so that the stale of a Trivium module in the server is the same as that of the Trivium module in the client.

Further, the Trivium module in the server generates a 64 bit random number in one cycle.

Further, all the polynomials are stored in memories, and the polynomials obtained at the same step are stored in different memories respectively.

The disclosure also provides a server, comprising a processor for implementation of a post-quantum key exchange protocol according to the method for implementation of the post-quantum key exchange protocol described above.

The disclosure also provides a system for implementation of a post-quantum key exchange protocol, comprising the client and the server described above, wherein the steps that the client generates the polynomial $\hat{u}$ and the server generates the polynomial $\hat{b}$ are synchronized; and the steps that the client generates the key μ and the polynomial $\bar{c}$ based on the Trivium module therein and the server generates the polynomial m based on the polynomial $\hat{u}$ are synchronized.

In general, the following beneficial effects can be achieved by adopting the aforementioned technical solutions conceived in the disclosure:

(1) A novel method tor generating the public polynomial $\hat{a}$ is proposed in the disclosure. The random number satisfying conditions is selected as a coefficient of the polynomial $\hat{a}$ by parsing a random number sequence outputted by the Trivium module. As long as initialization conditions of the Trivium modules of both sides are the same, the same random number sequence can be obtained; and then, as long as coefficient parsing rules are the same, the public polynomials $\hat{a}_1$ and $\hat{a}_2$ obtained by the both sides are the same. The method for generating the public polynomials has the advantage that the client and the server can generate the public polynomials synchronously, thereby simplifying the complexity of the key exchange process. The synchronous generation of the public polynomials means that the polynomials $\hat{b}$ and $\hat{u}$ as well as the polynomials m and n can be calculated synchronously, thereby reducing the calculation time of the whole process. Meanwhile, the server does not need to transmit information associated with the public polynomials to the client, thereby reducing the transmission bandwidth.

(2) A novel data exchange solution between the server and the client is proposed in the disclosure. The server waits for the data request signal sent by the client after generating the polynomial $\hat{b}$. The client will send the data request signal to the server after generating the polynomial $\hat{u}$. The server sends the polynomial $\hat{b}$ to the client after receiving the data request signal. Then, the server sends the data request signal to the client. The client detects the data request signal of the server after finishing receiving the polynomial $\hat{b}$, and sends the polynomial $\hat{u}$ to the server, thereby completing the first data transmission between the two ends. The server sends the data request signal to the client after generating the polynomial m. The client detects the data request signal after generating the polynomial $\bar{c}$, and sends the polynomial $\bar{c}$ to the server after the data request signal is detected, thereby completing the second data transmission. This data exchange solution enables the data of the client to be sent to the server in twice, thereby reducing the transmission bandwidth. Meanwhile, a handshaking mode is adopted to keep calculation procedures of the server and the client consistent, thereby reducing the calculation time, ensuring that both sides are always in the same key exchange process and improving the stability of the system.

(3) A stale synchronization mechanism between the server and the client is proposed in the disclosure. Since the polynomial coefficients of both sides are obtained by the random numbers outputted by the Trivium modules, in order to obtain the same public polynomial $\hat{a}$ for both sides, internal states of the Trivium modules of both sides shall be the same when starling the key exchange. In a key exchange process, the client needs to generate the polynomial e" and an original key v, so that the Trivium module in the client works for a certain cycle longer titan that in the server. Therefore, after the server calculates a final key μ, the Trivium module in the server will continue to work for the same cycle to ensure that the Trivium modules of both sides will have the same state when starting the next key exchange. The state synchronization mechanism is adopted to avoid initializing the Trivium module when starting the key exchange every time. Multiple key exchanges can be completed by only initializing the Trivium modules once, thereby improving the work efficiency of the system.

(4) A dual port random access memory (DPRAM) is adopted to store the polynomial coefficients in the disclosure, thereby reducing the consumption of register resources for the system. A fast number theoretic transformation (FNTT) module can read two coefficients simultaneously for number-theoretic transformation, thereby increasing the calculation speed. The transmission process of the polynomials is changed into reading from and writing into the memory instead of operating some bits of the register, thereby improving the operation efficiency of the system.

DESCRIPTION OF THE DRAWINGS

FIG. 1 is a flow block diagram of a method for implementation of a post-quantum key exchange protocol according to an embodiment of the disclosure;

DETAILED DESCRIPTION OF PREFERRED EMBODIMENTS

Figure 2:
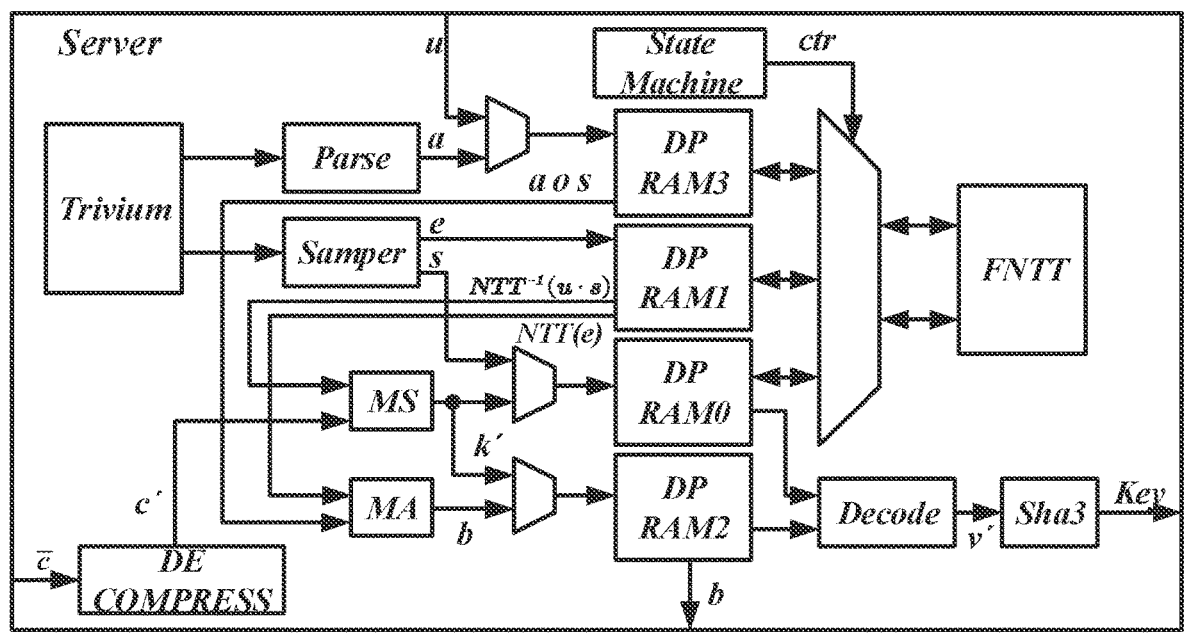
FIG. 2 is a diagram of a processor for implementation of a post-quantum key exchange protocol in a server according to an embodiment of the disclosure.

In order to make purposes, technical solutions and advantages of the disclosure clearer, the disclosure will be further described in detail with reference to the accompanying drawings and embodiments below. It shall be understood that embodiments described herein are only used for explaining the disclosure and are not intended to limit the disclosure. In addition, the technical features involved in various embodiments of the disclosure described below can be combined with each other as long as the technical features do not conflict with each oilier.

Embodiment 1

Referring to FIG. 1, a method 100 for implementation of a post-quantum key exchange protocol comprises:

Step 110, a client generates the public polynomial $\hat{a}_1$ based on a Trivium module therein and generates the polynomial $\hat{u}$ based on the polynomial $\hat{a}_1$, then sends data request signal to a server to receive the polynomial $\hat{b}$ sent by the server, and receives data request signal sent by the server to send the polynomial $\hat{u}$ to the server. The public polynomial $\hat{a}_2$ for calculating the polynomial $\hat{b}$ is generated by the server with adoption of a random number sequence generated by a Trivium module in the server, and $\hat{a}_1 = \hat{a}_2$.

Step 120, the client generates the key $\mu$ and the polynomial $\bar{c}$ based on the Trivium module therein, and sends the polynomial $\bar{c}$ to the server based on another received data request signal sent by the server, so that the server generates the key $\mu$ based on the polynomial $\bar{c}$ and adjusts a state of the Trivium module in the server to be synchronized with a current state of the Trivium module in the client.

When the method is carried out for the first time, the Trivium modules of the client and the server shall be initialized; a random number sequence outputted by the module will be used as a random number source of coefficients for binary sampling and public polynomial; and no additional algorithm or system is required for generating the public polynomial coefficients, thereby reducing the complexity of the system.

The random number sequence is obtained by the Trivium module (i.e., a Trivium stream cipher algorithm). 16 bit numbers in the random number sequence are selected for calculation to obtain 14 bit numbers, which satisfy the requirements on polynomial coefficients, i.e., less than q, as the coefficients of the public polynomial $\hat{a}$.

In addition, it should be noted that the client can receive the data request signal sent by the server after sending the data request signal to the server and receiving the polynomial $\hat{b}$ sent by the server, to send the polynomial $\hat{u}$ to the server.

The Trivium modules of the server and the client have a state synchronization mechanism, so that the system can automatically complete multiple key exchange processes without additional input data.

Preferably, the step of generating the polynomial $\hat{u}$ based on the polynomial $\hat{a}_1$ comprises:

A step that the client side adopts the random number sequence generated by the Trivium module therein to generate polynomials s' and e' respectively, calculates number-theoretic transformation polynomials of the polynomials s' and e' respectively, and A step of calculating a sum of the number-theoretic transformation polynomial of the polynomial e' and a product of the number-theoretic transformation polynomial of the polynomial s' and the public polynomial $\hat{a}_1$ to obtain the polynomial $\hat{u}$.

The Trivium module in the client generates a 64 bit random number in one cycle.

Since the existing Trivium module used for implementing the post-quantum key exchange protocol outputs a 1 bit random number in a single cycle and the coefficients of the polynomial is 14 bit, it takes at least 64 cycles to generate coefficients of two polynomials, while the Trivium module in the present disclosure can generate a 64 bit random number in one cycle and can generate the coefficients of two polynomials in one cycle according to a binomial sampling algorithm. Therefore, the method has high polynomial generation efficiency.

The coefficients of the polynomials s' and e' are obtained by performing binary sampling on the random number sequence generated by the Trivium module in the client, and the aforementioned number-theoretic transformation polynomials refer to new polynomials obtained by number-theoretic transformation of the polynomials.

Further, the step that the client generates the key $\mu$ and the polynomial $\bar{c}$ based on the Trivium module therein comprises:

A step that the client synchronously calculates the key $\mu$ and the polynomial e" based on the random number sequence generated by the Trivium module therein, calculates a product of the number-theoretic transformation polynomial of s' and the polynomial $\hat{b}$, and performs inverse number-theoretic transformation to the product, wherein the key $\mu$ is obtained in a manner that the client performs first SHA3 on the random number sequence generated by the Trivium module in the client to obtain v' and performs the second SHA3 on v'; and the client encodes v' to obtain the polynomial k, calculates a sum of the polynomial e", the polynomial k and a result of the inverse the number-theoretic transformation to obtain the polynomial c, and compresses data of the polynomial c to obtain the polynomial $\bar{c}$.

A 256 bit random number, as an original key v, is selected from the random number sequence generated by the Trivium module. The original key is hashed twice by the SHA3 to obtain the final key $\mu$.

Preferably, all the polynomials are stored in memories, and the polynomials obtained at the same step are stored in different memories respectively.

Embodiment 2

A client comprises a processor for implementation of a post-quantum key exchange protocol according to the method for implementation of the post-quantum key exchange protocol described in the Embodiment 1. The related technical solution is the same as that of the Embodiment 1 and thus is not repeated herein.

Embodiment 3

A method for implementation of a post-quantum key exchange protocol comprises:

A step that a server generates the public polynomial $\hat{a}_2$ based on a Trivium module therein and generates the polynomial $\hat{b}$ based on the polynomial $\hat{a}_2$, then receives the data request signal sent by a client to send the polynomial $\hat{b}$ to the client, and sends the data request signal to the client to receive the polynomial $\hat{u}$ sent by the client, wherein the polynomial $\hat{a}_1$ for calculating the polynomial $\hat{u}$ is generated by the client with adoption of a random number sequence generated by the Trivium module in the client, and $\hat{a}_1 = \hat{a}_2$;

A step that the server generates the polynomial m based on the polynomial $\hat{u}$, sends another data request signal to the client to receive the polynomial $\bar{c}$ corresponding to a key $\mu$ sent by the client, and generates the key $\mu$ based on the polynomial m and the polynomial $\bar{c}$; and A step that the server controls the Trivium module therein to continue working for a certain time so that a stale of the Trivium module in the server is the same as a state of the Trivium module in the client.

When the method is carried out for the first time, the Trivium modules of the client and the server shall be initialized; random number sequences outputted by the Trivium modules will be used as random number sources of coefficients for binary sampling and public polynomials; and no additional algorithm or system is required for generating the public polynomial coefficients, thereby reducing the complexity of the system. After completing implementing the post-quantum key exchange protocol each time, the Trivium module of the server continues to work for a period of time to make the state of the Trivium module in the server is the same as that of the Trivium module in the client. Therefore, the Trivium modules in the server and the client in the method have a state synchronization mechanism, so that the system can automatically perform multiple key exchange processes without additional data input or initialization operations.

The coefficients of the polynomials s and e are obtained by performing binary sampling on the random numbers generated by the Trivium module; and the polynomials s and e are respectively subjected to number-theoretic transformation to obtain ŝ=NTT(s) and ê=NTT(e). The public polynomial $\hat{a}_2$ and polynomial ŝ are subjected to dot product to obtain a result; and the obtained result is added to the result obtained after number-theoretic transformation of the polynomial e to obtain the polynomial b̂, which is denoted as b̂=$\hat{a}_2$·ŝ+NTT(e).

In addition, the server performs inverse number-theoretic transformation on the result obtained after dot product of the polynomial û and the polynomial ŝ to obtain the polynomial m, which is denoted as m=$NTT^{-1}$(û·ŝ).

Preferably, the Trivium module generates a 64 bit random number in one cycle.

Since the existing Trivium module uses for implementing the post-quantum key exchange protocol outputs a 1 bit random number in a single cycle and the coefficients of the polynomial is 14 bit, it lakes at least 64 cycles to generate coefficients of two polynomials, while the Trivium module of the present method can generate a 64 bit random number in one cycle and can generate the coefficients of two polynomials in one cycle according to a binomial sampling algorithm. Therefore, the method has high polynomial generation efficiency.

Preferably, all the polynomials are stored in memories, and the polynomials obtained at the same step are stored in different memories respectively.

Embodiment 4

A server comprises a processor for implementation of a post-quantum key exchange protocol according to the method for implementation of the post-quantum key exchange protocol described in the Embodiment 3. The related technical solution is the same as that of the Embodiment 3 and thus is not repeated herein.

Embodiment 5

A system for implementation of a post-quantum key exchange protocol comprises the client and the server described in the Embodiment 2 and the Embodiment 4. The steps that the client generates the polynomial û and the server generates the polynomial b̂ are synchronized; and the steps that the client generates a key μ and the polynomial c̄ based on the Trivium module therein and the server generates the polynomial m based on the polynomial û are synchronized.

The client and the server can synchronously generate the public polynomial â and the polynomials s, e, s' and e', synchronously calculate the polynomials b̂ and ū, and synchronously calculate the polynomials m and n.

In order to belter illustrate the disclosure, specific examples of the processors for implementation of the post-quantum key exchange protocol in the server and the client are given.

A circuit structure of the processor corresponding to the server is shown in FIG. 2; and the working process is as follows:

1. The Trivium module generates a 64 bit random number in every cycle and sends the 64 bit random number to a binary sampling module (i.e. Samper); and the Samper divides the 64 bit random number into four 16 bit random number, calculates a difference between hamming weights of a first random number and a second random number as the coefficients of the polynomial s, and calculates a difference between hamming weights of a third random number and a fourth random number as the coefficients of the polynomial e. The polynomials s and e have 1024 coefficients; and each coefficient is 64 bit. The polynomial s is stored in a dual-port random access memory 0 (DPRAM0); and the polynomial e is stored in a DPRAM1.

2. The Trivium module generates a 64 bit random number in every cycle and sends the 64 bit random number to a parse module. Since all the calculations in the key exchange protocol are performed on an integer ring with modulo q=12289, each coefficient of the polynomial shall be less than q. The parse module divides the 64 bit random number into four 16 bit numbers in sequence, compares each number with 5q, discards the random number if the random number is greater than 5q, converts the 16 bit random number into a 14 bit random number after modulo q if the random number is less than 5q, and stores the 14 bit number in a DPRAM3 as the coefficients of the public polynomial â, which is denoted as â hereafter due to $\hat{a}_1=\hat{a}_2$.

While generating the public polynomial â, an FNTT module is connected with the DPRAM0 and a DPRAM2 to calculate the polynomial ŝ=NTT(s); and the ŝ obtained will be stored in the DPRAM0.

3. The FNTT module is connected with the DPRAM1 and the DPRAM2 to calculate the number-theoretic transformation of the polynomial e; and the obtained result will be stored in the DPRAM1.

4. The FNTT module is connected with the DPRAM0 and a DPRAM3 to calculate a dot product of the polynomials â and ŝ by using a dot product mode of the FNTT module, and the result will be stored in the DPRAM3. Then, the output data ports of the DPRAM3 and the DPRAM1 are connected with the modulo addition module (MA) to calculate the polynomial b̂=â·ŝ+NTT(e), wherein the obtained polynomial b̂ is stored in the DPRAM2.

5. The server sends the polynomial b̂ to the client, and receives the polynomial û from the client to store the polynomial û in the DPRAM3.

6. The FNTT module is connected with the DPRAM0 and the DPRAM3 to calculate the dot product of the polynomial š and the polynomial û by using the dot product mode of the FNTT module, and the result will be stored in the DPRAM3.

7. The FNTT module is connected with the DPRAM3 and the DPRAM1 to calculate the polynomial m=$NTT^{-1}$(û·ŝ). by using the calculation mode for the inversion number-theoretic transformation of the FNTT module, and the obtained polynomial m will be stored in the DPRAM1.

8. The server receives the polynomial $\bar{c}$ from the client and receives the input connection between the data port and a data decompress module. Output of the Decompress module and output of DPRAM1 are connected with the input of a modulo subtraction module (MS) to calculate the polynomial k'=c'−m; and the obtained polynomial k' is divided into two parts, which are stored at addresses 0 to 511 of the DPRAM2 and addresses 512 to 1023 of the DPRAM0.

9. The outputs of the DPRAM0 and the DPRAM2 are connected with the input of data decode module (Decode); the output of the decode module is connected with an SHA3 module; and the output of the SHA3 module is the final key.

Figure 3:
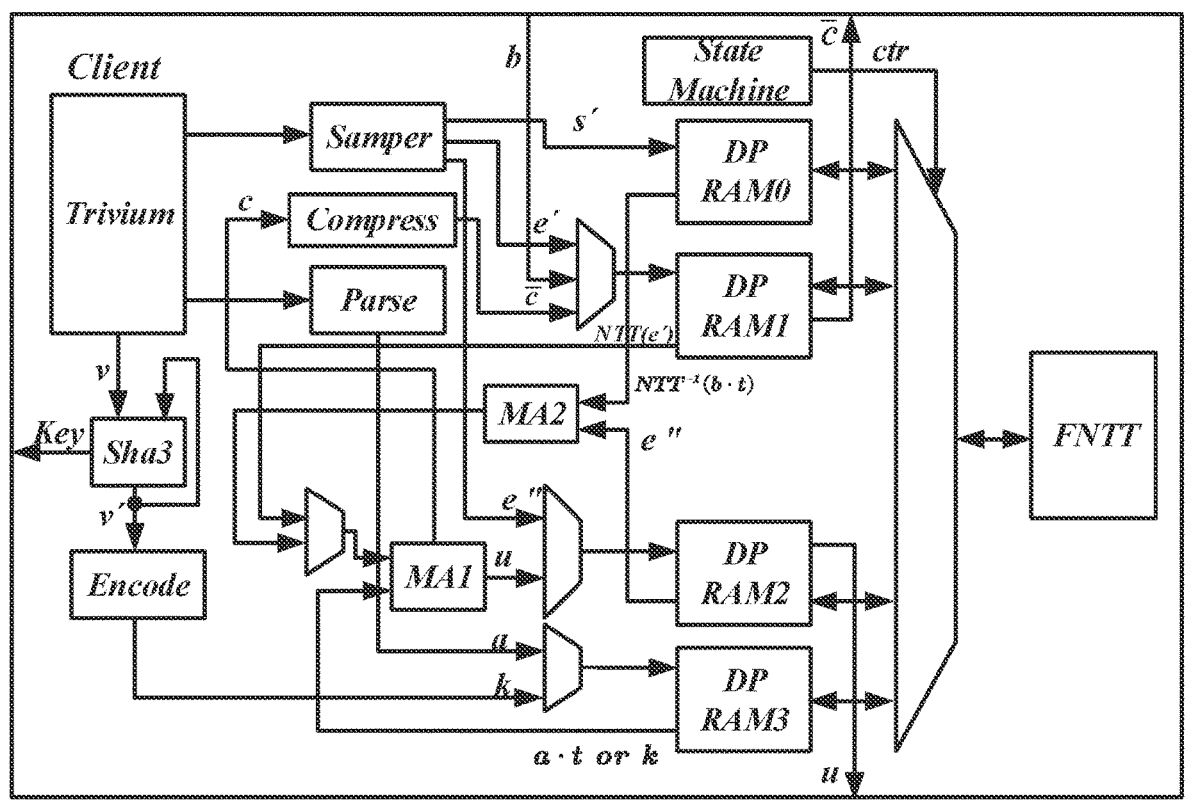
FIG. 3 is a diagram of a processor for implementation of a post-quantum key exchange protocol in a client according to an embodiment of the disclosure.

A circuit structure of the processor corresponding to the client is shown in FIG. 3; and the working process is as follows:

1-4. The first four steps of the client and the server are basically the same, except that in tire second step, the Samper module of the client uses the difference between the hamming w eights of the first random number and the third random number as the coefficients of the polynomial s', and calculates the difference between the hamming weights of the second random number and the fourth random number as the coefficients of the polynomial e', to ensure that the polynomials s and s' as well as the polynomials e and e' are different.

5. The client sends the polynomial $\hat{u}$ to the server, and receives the polynomial $\hat{b}$ from the server and stores it in the DPRAM1.

6. The output of the Trivium module is connected with the SHA3 module to obtain v' after performing the first hash transformation on the original key v generated by the Trivium module.

7. The FNTT module is connected with the DPRAM0 and the DPRAM1 to calculate the dot product of the polynomial $\hat{b}$ and the polynomial $\hat{t}$ by using the dot product function of the FNTT module, and the result will be stored in the DPRAM1. The output of the Trivium module is connected with the Samper module while performing dot product calculation, to generate the polynomial e'', which is stored in the DPRAM2.

The output v' of the SHA3 is connected with a data encode module while performing dot product calculation, and the output of the encode module is the coefficients of the polynomial k and is stored in the DPRAM3.

8. The FNTT module is connected with the DPRAM1 and the DPRAM0 to calculate the polynomial n=NTT$^{-1}(\hat{b}\cdot\hat{t})$ by using a calculation function for the inversion number-theoretic transformation of the FNTT module, and the obtained polynomial n will be stored in the DPRAM0.

9. The outputs of the DPRAM0 and the DPRAM2 are connected with an MA2 module; the output of MA2 is connected with the input of an MA1; and the output of the DPRAM3 is connected with the input of the MA1. The output of the MA1 is connected with the input of the DPRAM2 and the compress module. The output of the compress module is connected with the input of the DPRAM1. After completing calculation, the polynomial c=n+e''+k is stored in the DPRAM, and the polynomial $\bar{c}$=NHSCompress(c) is stored in the DPRAM1.

10. The client sends the polynomial $\bar{c}$ to the server.

11. The output of v' is used as the input of the SHA3 module; and the Hash transformation is performed on v' once to obtain the output of the SHA3 module as the final key.

The related technical solution is the same as that in the Embodiment 1 to the Embodiment 4 and thus is not repeated herein.

Obviously, the above only describes preferred embodiments of the disclosure and is not intended to limit the disclosure; and any modification, equivalent substitution and improvement made within the spirit and principles of the disclosure shall be included within the protection scope of the disclosure.

We claim:

1. A method for implementation of a post-quantum key exchange protocol, comprising:
   a client generating a public polynomial $\hat{a}_1$ based on a Trivium module therein and generating a polynomial $\hat{u}$ based on the polynomial $\hat{a}_1$, then sending a data request signal to a server to receive a polynomial $\hat{b}$ sent by the server for secured key transmission, and receiving data request signal sent by the server to send the polynomial $\hat{u}$ to the server, wherein a public polynomial $\hat{a}_2$ for calculating the polynomial $\hat{b}$ is generated by the server with adoption of a random number sequence generated by a Trivium module in the server, and $\hat{a}_1=\hat{a}_2$; and
   the client generating a key μ and a polynomial $\bar{c}$ based on the Trivium module therein, and sending the polynomial $\bar{c}$ to the server based on another received data request signal sent by the server, so that the server generates the key μ based on the polynomial $\bar{c}$ and adjusts a state of the Trivium module in the server to be synchronized with a current state of the Trivium module in the client;
   wherein the public polynomials $\hat{a}_1$ and $\hat{a}_2$ are generated based on the Trivium module of the client and the Trivium module of the sever, respectively, and wherein the Trivium module of the client and the Trivium module of the server operate separately and the public polynomials $\hat{a}_1$ and $\hat{a}_2$ are generated separately and independently of each other.

2. The method according to claim 1, wherein the step of generating the polynomial $\hat{u}$ based on the polynomial $\hat{a}_1$ comprises:
   the client adopting the random number sequence generated by the Trivium module in the client to generate polynomials s' and e' respectively, and calculating number-theoretic transformation polynomials of the polynomials s' and e' respectively, and
   calculating a sum of the number-theoretic transformation polynomial of the polynomial e' and a product of the number-theoretic transformation polynomial of the polynomial s' and the public polynomial $\hat{a}_1$ to obtain the polynomial $\hat{u}$,
   wherein the Trivium module in the client generates a 64 bit random number in one cycle.

3. The method according to claim 1, wherein the client generating the key μ and the polynomial $\bar{c}$ based on the Trivium module therein comprises:
   the client respectively calculating the key μ and a polynomial e'' based on the random number sequence generated by the Trivium module therein, calculating a product of the number-theoretic transformation polynomial of the polynomial s' and the polynomial $\hat{b}$, and performing inverse number-theoretic transformation to the product, wherein the key μ is obtained in a manner that the client performs first secure hash algorithm 3 (SHA3) to the random number sequence generated by the Trivium module therein to obtain v' and performs second SHA3 on the v';
   the client encoding the v' to obtain a polynomial k; and calculating a sum of the polynomial e″, the polynomial k and the result of the inverse number-theoretic transformation to obtain a polynomial c, and compressing data of the polynomial c to obtain the polynomial $\bar{c}$.

4. The method according to claim 3, wherein all the polynomials are stored in memories, wherein the polynomials obtained at the same step are stored in different memories respectively.

5. A method for implementation of a post-quantum key exchange protocol, comprising:
a server generating a public polynomial $â_2$ based on a Trivium module therein and generating a polynomial $\hat{b}$ based on the polynomial $â_2$, then receiving a data request signal sent by a client to send the polynomial $\hat{b}$, and sending a data request signal to the client to receive a polynomial $û$, wherein a polynomial $â_1$ for calculating the polynomial $û$ is generated by the client with adoption of a random number sequence generated by a Trivium module in the client, and $â_1=â_2$;
the server generating a polynomial m based on the polynomial $û$, sending another data request signal to the client to receive a polynomial $\bar{c}$ corresponding to a key $\mu$ sent by the client, and generating the key $\mu$ based on the polynomial m and the polynomial $\bar{c}$;
the server controlling the Trivium module therein to continue working for a certain time so that a state of the Trivium module in the server is the same as a state of the Trivium module in the client;
wherein the public polynomials $â_1$ and $â_2$ are generated based on the Trivium modules of the client and the server, respectively, and wherein the Trivium module of the client and the Trivium module of the server operate separately and the public polynomials $â_1$ and $â_2$ are generated separately and independently of each other.

6. The method according to claim 5, wherein the Trivium module in the server generates a 64 bit random number in one cycle.

7. The method according to claim 5, wherein all the polynomials are stored in memories, and the polynomials obtained at the same step are stored in different memories respectively.

8. A system for implementation of a post-quantum key exchange protocol, comprising a client and a server,
wherein the client is configured to generate a public polynomial $â_1$ with adoption of a random number sequence generated by a Trivium module in the client and generate a polynomial $û$ based on the polynomial $â_1$, send a first data request signal to the server, and send the polynomial $û$ to the server according to a second data request signal from the server;
the client is further configured to generate a key $\mu$ and a polynomial $\bar{c}$ based on the Trivium module therein, and send the polynomial $\bar{c}$ to the server according to a third data request signal sent by the server;
the server is configured to generate a public polynomial $â_2$ with adoption of a random number sequence generated by a Trivium module in the server, generate a polynomial $\hat{b}$ based on the polynomial $â_2$, send the polynomial $\hat{b}$ to the client according to the first data request signal and send the second data request signal to the client; and $â_1=â_2$;
the server is further configured to generate a polynomial m based on the polynomial $û$, send the third data request signal to the client, and generate the key $\mu$ based on the polynomial m and the polynomial $\bar{c}$; and
steps that the client generates the polynomial $û$ and the server generates the polynomial $\hat{b}$ are synchronized; and the steps that the client generates the key $\mu$ and the polynomial $\bar{c}$ based on the Trivium module in the client and the server generates the polynomial m based on the polynomial $û$ are synchronized;
wherein the public polynomials $â_1$ and $â_2$ are generated based on the Trivium modules of the client and the server, respectively, and wherein the Trivium module of the client and the Trivium module of the server operate separately and the public polynomials $â_1$ and $â_2$ are generated separately and independently of each other.

9. The system according to claim 8, wherein the Trivium module in the client and the Trivium in the server are configured to generate a 64 bit random number in one cycle.

10. The system according to claim 8, the client and the system each comprises memories, all the polynomials are stored in memories, and the polynomials obtained at the same step are stored in different memories respectively.

* * * * *